(12) United States Patent
Zhang et al.

(10) Patent No.: US 8,199,694 B2
(45) Date of Patent: Jun. 12, 2012

(54) METHOD FOR SWITCHING SERVICE OPTION TO CIRCUIT DATA

(75) Inventors: Zhihui Zhang, Shenzhen (CN); Bifeng Xie, Shenzhen (CN); Donghua Lu, Shenzhen (CN); Jian Cao, Shenzhen (CN); Wanchun Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 302 days.

(21) Appl. No.: 12/518,080

(22) PCT Filed: Dec. 13, 2006

(86) PCT No.: PCT/CN2006/003398
§ 371 (c)(1), (2), (4) Date: Jul. 14, 2009

(87) PCT Pub. No.: WO2008/071034
PCT Pub. Date: Jun. 19, 2008

(65) Prior Publication Data
US 2010/0316023 A1    Dec. 16, 2010

(51) Int. Cl.
*H04B 7/216* (2006.01)
*H04B 7/00* (2006.01)

(52) U.S. Cl. ......... 370/320; 370/335; 370/342; 455/510

(58) Field of Classification Search .................... None
See application file for complete search history.

(56) References Cited

U.S. PATENT DOCUMENTS

| | | | | |
|---|---|---|---|---|
| 6,070,089 A | * | 5/2000 | Brophy et al. | 455/560 |
| 6,393,008 B1 | * | 5/2002 | Cheng et al. | 370/338 |
| 6,549,543 B1 | * | 4/2003 | Shin | 370/474 |
| 6,574,196 B1 | * | 6/2003 | Lee | 370/241 |
| 6,708,031 B2 | * | 3/2004 | Purnadi et al. | 455/436 |
| 2001/0041564 A1 | * | 11/2001 | Kim | 455/422 |
| 2002/0037710 A1 | * | 3/2002 | Park | 455/414 |
| 2002/0082051 A1 | * | 6/2002 | Tangorra et al. | 455/561 |
| 2002/0085514 A1 | * | 7/2002 | Illidge et al. | 370/329 |
| 2002/0098865 A1 | * | 7/2002 | Jang et al. | 455/557 |
| 2002/0126652 A1 | * | 9/2002 | Ha et al. | 370/352 |
| 2004/0109425 A1 | * | 6/2004 | Scribano et al. | 370/331 |
| 2005/0013281 A1 | * | 1/2005 | Milton et al. | 370/349 |
| 2005/0037790 A1 | * | 2/2005 | Chang | 455/510 |
| 2005/0124299 A1 | * | 6/2005 | Scribano et al. | 455/68 |
| 2006/0183472 A1 | * | 8/2006 | Nookala et al. | 455/426.1 |

* cited by examiner

*Primary Examiner* — Andrew Chriss
(74) *Attorney, Agent, or Firm* — PatentVenrues: Bennett Smith; Korbin Van Kyke

(57) ABSTRACT

This invention discloses a method for switching SO (Service Option) to circuit data, including the following steps: step 1, a mobile station notifies a source BS (Base Station) and/or a target BS to switch SO to circuit data during a session; step 2, the source BS and/or the target BS negotiates with a mobile switching subsystem about switching SO to circuit data, and determines the bearer format parameters of the session through the negotiation; step 3, the source BS and/or the target BS makes a secondary service negotiation with the mobile station after the negotiation with the mobile switching subsystem succeeds; and step 4, after the negotiation with the mobile station succeeds, the source BS and/or the target BS conducts user interface service layer encapsulation on the circuit data according to a certain load format, and then transmits the encapsulated Real Time Transfer Protocol packets to the other BS.

20 Claims, 8 Drawing Sheets

| 7 | 6 | 5 | 4 | 3 | 2 | 1 | 0 | 8 bytes |
|---|---|---|---|---|---|---|---|---|
| | | | Alp information identifier | | | | | 1 |
| | | | Length | | | | | 2 |
| Reservations | | | maximum number of frames | | | session IP address type | session address sign | 3 |
| (Highest level) | | | session IP address | | | | | i |
| | | | ... | | | | | ... |
| | | | | | | | (lowest level) | j |
| (Highest level) | | | session IP address | | | | | j+1 |
| | | | | | | | (lowest level) | j+2 |

| 7 | 6 | 5 | 4 | 3 | 2 | 1 | 0 | 8 bytes |
|---|---|---|---|---|---|---|---|---|
| colspan=8 | Alp information identifier | | | | | | | 1 |
| colspan=8 | Length | | | | | | | 2 |
| colspan=4 | Bearer format number | | | | colspan=4 | bearer IP address type | | | | 3 |
| colspan=8 | Bearer format length | | | | | | | m |
| Extended bit | colspan=3 | Bearer format label type | | | colspan=4 | bearer format ID | | | | m+1 |
| colspan=7 | RTP load type | | | | | | | bearer address sign | m+2 |
| (Highest level) | colspan=7 | Session IP address | | | | | | | i |
| colspan=8 | ... | | | | | | | ... |
| colspan=7 | | | | | | | | (Lowest level) | j |
| (Highest level) | colspan=7 | Session IP address | | | | | | | j+1 |
| colspan=7 | | | | | | | | (Lowest level) | j+2 |
| colspan=4 | Extended length | | | | colspan=4 | extended ID | | | | k |
| colspan=8 | Extended parameters | | | | | | | k+1 |
| colspan=8 | ... | | | | | | | ... |

Fig. 3 (Prior Art)

| Extended ID | extended length | name | extended parameters | application |
|---|---|---|---|---|
| 0 | 1 | Voice frame interleaving | refer to IOS5.0 table | only applicable to full head bearer type such as EVRC and SMV |
| 7 | 2 | Land circuit service option | refer to Fig.5 | only applicable to circuit data |
| All the other reservations |||||

Fig. 6

| 7 | 6 | 5 | 4 | 3 | 2 | 1 | 0 | 8 bytes |
|---|---|---|---|---|---|---|---|---|
| (MSB) | Service Option |||||||  q+1 |
| | = 1004H (Async Data Rate Set 1 ), 1005H (G3 Digital Fax Rate Set 1 ), 0014H (G3 Analog Fax Rate Set 1 ), 000CH (Async Data Rate Set 2 ), 000DH (G3 Digital Fax Rate Set 2 ), 0015H (G3 Analog Fax Rate Set 2 ), 0004H (Async Data Rate Set 1 ), 0005H (G3 Digital Fax Rate Set 1), |||||| (LSB) | q+2 |

Wherein 0x0004 and 0x0005 are Async Data Rate Set 1 and G3 Digital Fax Rate Set 1, defined in IS99 protocol and have been replaced with 0x1004 and 0x1005 in IS707 protocol.

Fig. 7

METHOD FOR SWITCHING SERVICE OPTION TO CIRCUIT DATA

FIELD OF THE INVENTION

The present invention relates to a method for switching SO (Service Option) to circuit data during the voice call of CDMA2000 LMSD (Legacy Mobile Station Domain), in particular, to a negotiation method for switch of voice into circuit data between BSS (Base Station Subsystem) and MSS (Mobile Switching Subsystem) and a negotiation method for such switch between BSS and MS (Mobile Station).

BACKGROUND OF THE INVENTION

Packet based CDMA2000 BSS can be accessed to CDMA2000 core network based on soft switch using IP (Internet Protocol) switching technologies. Compared with traditional circuit domain MSS (Mobile Switching Subsystem) system, the most prominent change of CDMA2000 core network based on soft switch lies in the separation of call control from bearer. Packet based network technology is used to replace TDM (Time Division Multiplexing) technology, traditional MSC (Mobile Switching Center) network element evolves into MSCe (Mobile Switching Center Emulator) and MGW (Media GateWay). MSCe provides the function of call control and mobility management, and MGW provides the function of media control and resources transmission and has the function of media stream operation.

MGW establishes bearer connection with SDU (Selection and Distribution Unit) in a base station system according to the acquired relevant information under the control of MSCe. This process is called bearer parameters negotiation.

Under the original TDM transmission mode, when circuit data service is being accomplished, CDMA access network needs to convert via vocoder circuit data from air interface into PCM (Pulse Coded Modulation) code stream which is then transmitted to MGW via TDM circuit. In the transmission mode of adopting IP switching technologies, CDMA access network does not need to perform conversion of coding and decoding, and directly transmits circuit data as RTP (Real-Time Transport Protocol) packet via IP network, and the structure of the protocol stack corresponding to the circuit data service is shown in FIG. 1.

During the realization of circuit data transmission, no matter the original TDM transmission mode or the current transmission mode of IP switching technologies cannot enable a user to freely switch between voice and circuit data during realizing circuit data. For example, if a user wants to realize wireless G3 fax under CDMA2000, when he/she transmits fax, operation code should be added ahead of fax number to differentiate voice service and fax service, and when he/she receives fax, a operation code for receiving fax must be set to a fixed station, so that the fixed station is set in a receiving fax mode, and after fax has been received, operation code must be set to the fixed station again so that the fixed station returns to the voice mode to answer calls. In this case, the process for a user to transmit fax is very complex and would easily have errors, which is very unhelpful to popularize wireless fax in CDMA2000 system.

Hence, in CDMA2000 network, strong demands for switching SO to circuit data during voice call exist in regions worldwide where CDMA2000 wireless fax is used.

SUMMARY OF THE PRESENT INVENTION

The present invention is made in view of the above problems. Hence, the present invention mainly aims to provide a method for switching SO to circuit data.

The method for switching SO to circuit data according to the embodiments of the present invention includes the following steps: step 1, a mobile station notifies a source BS (Base Station) and/or a target BS to switch a SO to circuit data during a session; step 2, the source BS and/or the target BS negotiates with a mobile switching subsystem about switching the SO into circuit data, and determines the bearer format parameters of the session through the negotiation; step 3, the source BS and/or the target BS makes a secondary service negotiation with the mobile station after the negotiation with the mobile switching subsystem succeeds; and step 4, after the negotiation with the mobile station succeeds, the source BS and/or the target BS conducts user interface traffic layer encapsulation on the circuit data according to a certain load format, and then transmits the encapsulated Real-Time Transport Protocol packets to the other BS.

In addition, the method preferably includes step 5: after receiving the Real Time Transfer Protocol packets, the source BS and/or the target BS analyzes user interface service layer user data and processes the same according to the load format, and obtains the payload of the circuit data.

Specifically, at step 2, the processing that the source BS and/or the target BS determines the bearer format parameters of the session includes the following steps:

step A, the source BS and/or the target BS sends a Bearer Update Required message to MSCe, wherein the Bearer Update Required message carries the bearer format parameters of circuit data that need to be used; step B, according to the bearer format parameters and the capability of MGW, the MSCe determines that the SO can be switched into circuit data during this session, and sends an assignment request message carrying the bearer format parameters to the source BS and/or the target BS; and step C, in response to the assignment request message, the source BS and/or the target BS determines the circuit data code used by this session, establishes corresponding channel resources, and sends a bearer update response message to the MSCe after the negotiation with a corresponding mobile terminal.

At step 3, the source BS and/or the target BS makes a secondary service negotiation with the mobile station, to notify the mobile station to switch the SO into circuit data, or to notify the mobile station that the BS side has completed the negotiation about switching the SO into circuit data.

At step 3, if the source BS and/or the target BS is the initiating party initiating the switch of voice into fax, the secondary service negotiation includes the following steps: step A, the source BS and/or the target BS sends a service connection message to the mobile station and agrees with the service configuration produced by the mobile station in a service request message; and step B, the mobile station returns a service connection completion message to the source BS and/or the target BS, and begins to use the new service configuration.

At step 3, if the source BS and/or the target BS is not the initiating party initiating the switch of voice into fax, the secondary service negotiation includes the following steps: step A, the source BS and/or the target BS sends a service request message to the mobile station, and sends to the mobile station the service configuration that the requested circuit data needs to use; step B, under the circumstance that the mobile station determines that the SO can be switched into circuit data during this session according to the received service configuration parameters and the capability of the mobile station per se, the mobile station sends a service response message to the source BS and/or the target BS and accepts the service configuration sent by the source BS and/or the target BS; step C, in response to the service response message, the source BS and/or the target BS determines the circuit data code used in this session, establishes corresponding channel resources, and sends a service connection message to the mobile station; and step D, in response to the service connection message, the mobile station returns a service connection completion message to the source BS and/or the target BS, and begins to use the new service configuration.

The technical solution according to the present invention realizes the function of switching SO to circuit data during the voice call of CDMA2000 LMSD, and the user only need to operate in the same way as the operation on fixed network fax when sending/receiving G3 fax, thereby simplifying the operation of sending/receiving fax. In addition, the problem of switching SO to voice after the completion of circuit data can be solved effectively in the same method.

Other characteristics and advantages of the present invention will be described in the following specification, and will be apparent partly from the specification and embodiments of the present invention. The objects and other advantages can be realized and obtained through the structure of the specification, claims, and the drawings.

BRIEF DESCRIPTION OF THE DRAWINGS

The drawings in the specification provide a further understanding to the present invention and constitute a part of the application. The exemplary embodiments of the present invention and the explanation thereof are given thereafter by way of illustration only, and thus are not limitative of the present invention, and wherein:

FIG. 3 is a schematic view of A2p bearer specific format parameters in the prior art;

FIG. 6 is a schematic view of A2p bearer format extended ID field in which the extended ID is 7 according to the embodiments of the present invention;

FIG. 7 is a schematic view of A2p bearer format extended parameter field in which the extended ID is 7 according to the embodiments of the present invention;

DETAILED DESCRIPTION

The principle of the present invention will be described first.

Figures 1, 2:
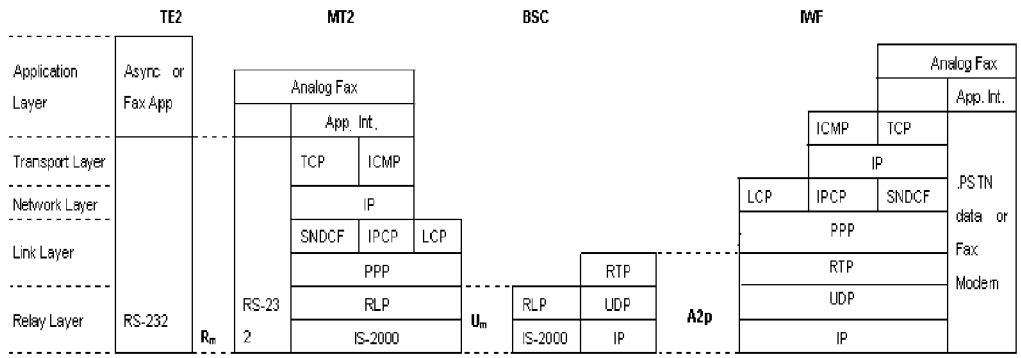
FIG. 1 is a schematic view of the structure of the protocol stack of the circuit data service in IP network according to CDMA2000 LMSD in the prior art.
FIG. 2 is a schematic view of A2p bearer session level parameters in the prior art.

In CDMA2000 LMSD, two problems as follows must be solved in switching SO to circuit data through voice: first, during the call, the time to initiate the negotiation about switching SO to circuit data through voice, how to make the sending terminal and the receiving terminal of the call be informed that the SO needs to be switched to circuit data during this session, and parameters related to the circuit data; and second, in CDMA2000 LMSD, how to conduct the negotiation by BSS and MSS about switching the SO to circuit data through voice, and generally speaking, the sending terminal and the receiving terminal can use high level control protocols (such as SDP) to conduct the negotiation of bearer format parameters, and 3G IOS V5.0 and higher version protocols do not directly use the SDP protocol at A1p interface while carry corresponding bearer format parameters via an extended A1 (the signaling structure between traditional BSC and MSC) interface control message to designate selected codes for a specific session, and please refer to FIG. 2 and FIG. 3 for the definitions of bearer session level parameters and bearer specific format parameters.

Figure 4:
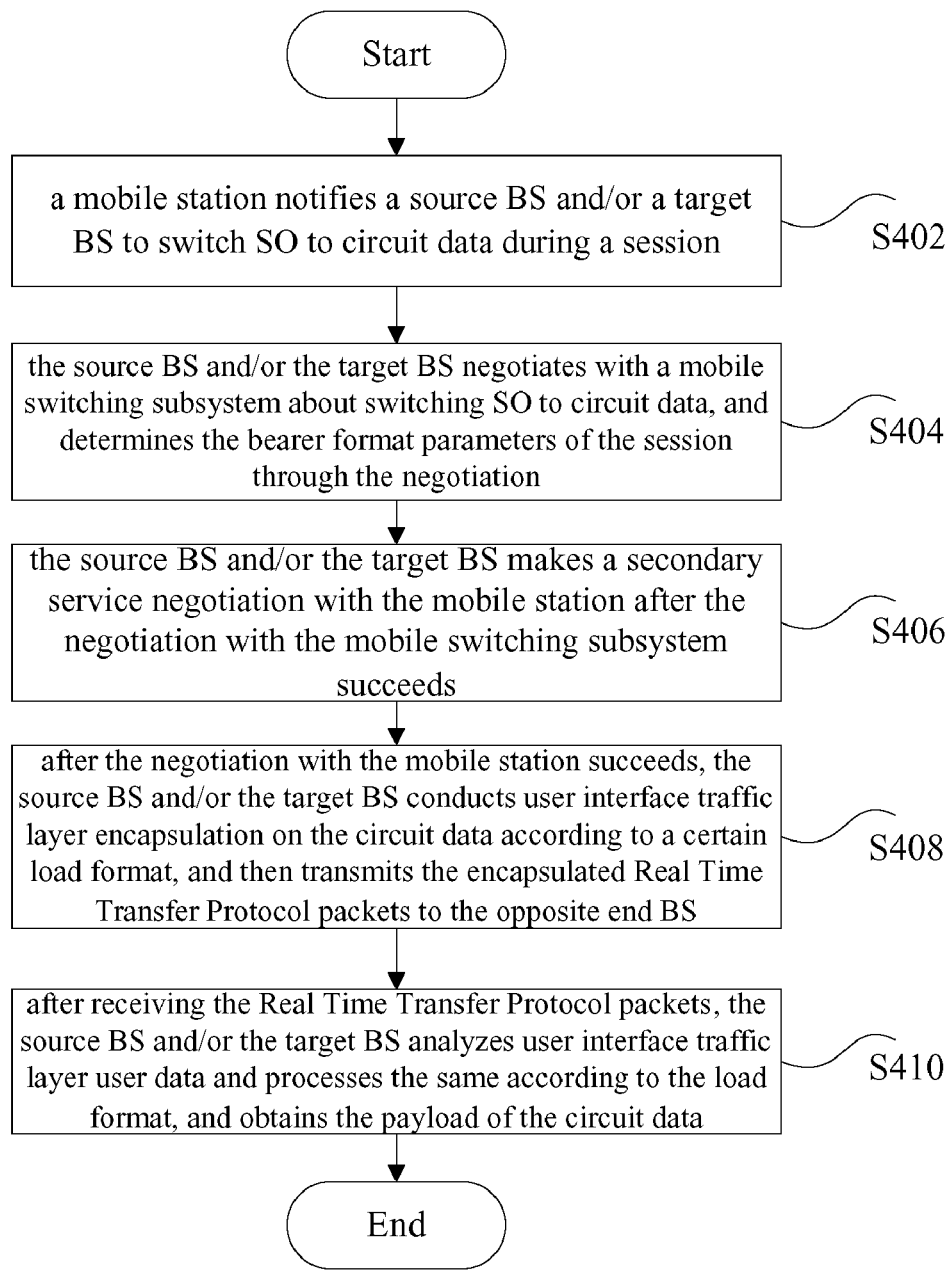
FIG. 4 is a flowchart of the method for switching SO to circuit data according to the embodiments of the present invention.

Therefore, as shown in FIG. 4, the method for switching SO to circuit data according to the embodiments of the present invention includes the following steps:

Step 402, a mobile station notifies a source BS and/or a target BS to switch the SO to circuit data during a session; S404, the source BS and/or the target BS negotiates with a mobile switching subsystem about switching the SO to circuit data, and determines the bearer format parameters of the session through the negotiation; S406, the source BS and/or the target BS makes a secondary service negotiation with the mobile station after the negotiation with the mobile switching subsystem succeeds; S418, after the negotiation with the mobile station succeeds, the source BS and/or the target BS conducts user interface traffic layer encapsulation on the circuit data according to a certain load format, and then transmits the encapsulated Real-Time Transport Protocol packets to the other BS; and S410, after receiving the Real-Time Transport Protocol packets, the source BS and/or the target BS analyzes user interface service layer user data and processes the same according to the load format, and obtains the payload of the circuit data.

The above steps will be described in detail hereinafter.

Step 402 will be described first.

During establishing the session, the source BS and/or the target BS determines that the code used in this session is voice (EVRC/8K/13K), and determines the bearer format parameters of this session through a negotiation with MSS; wherein, in the determined bearer format parameters, the bearer format ID value is a voice call bearer format ID such as 2(13K)/3 (EVRC)/4(EVRCO), etc.

The MS notifies the BS that the SO needs to be switched to circuit data, wherein when the circuit data is G3 fax, the MS determines whether to switch the SO to the G3 fax according to the CNG (Calling Tone)/CED (Called Terminal Identification) tone from the facsimile machine, and the switch is initiated by user's pressing the start key (or called confirm key, which has different names on different facsimile machines) on facsimile machine, or initiated by user's setting the facsimile machine in an automatic answer state, the MS informs the BS via a service request message in air interface, and the service request message includes circuit data SO supported by the current MS and the desired RC (Radio Configuration) configuration. In addition, the BS judges whether the current system supports the SO and the RC configuration requested in the MS service request message, and if the current system provides support, the BS starts to perform the operation of switching the SO to circuit data at the BS side and conducts a negotiation with MSS at the same time, otherwise the BS refuses the request of switching the SO to circuit data from the MS.

In addition, the above circuit data may be asynchronous data, and if so, the MS judges whether the method for switching the SO to circuit data is different from the above processing, for example, in specific circumstances, judgment may be conducted according to the calling number of the other terminal.

The following is the description of step 404.

Figure 5:
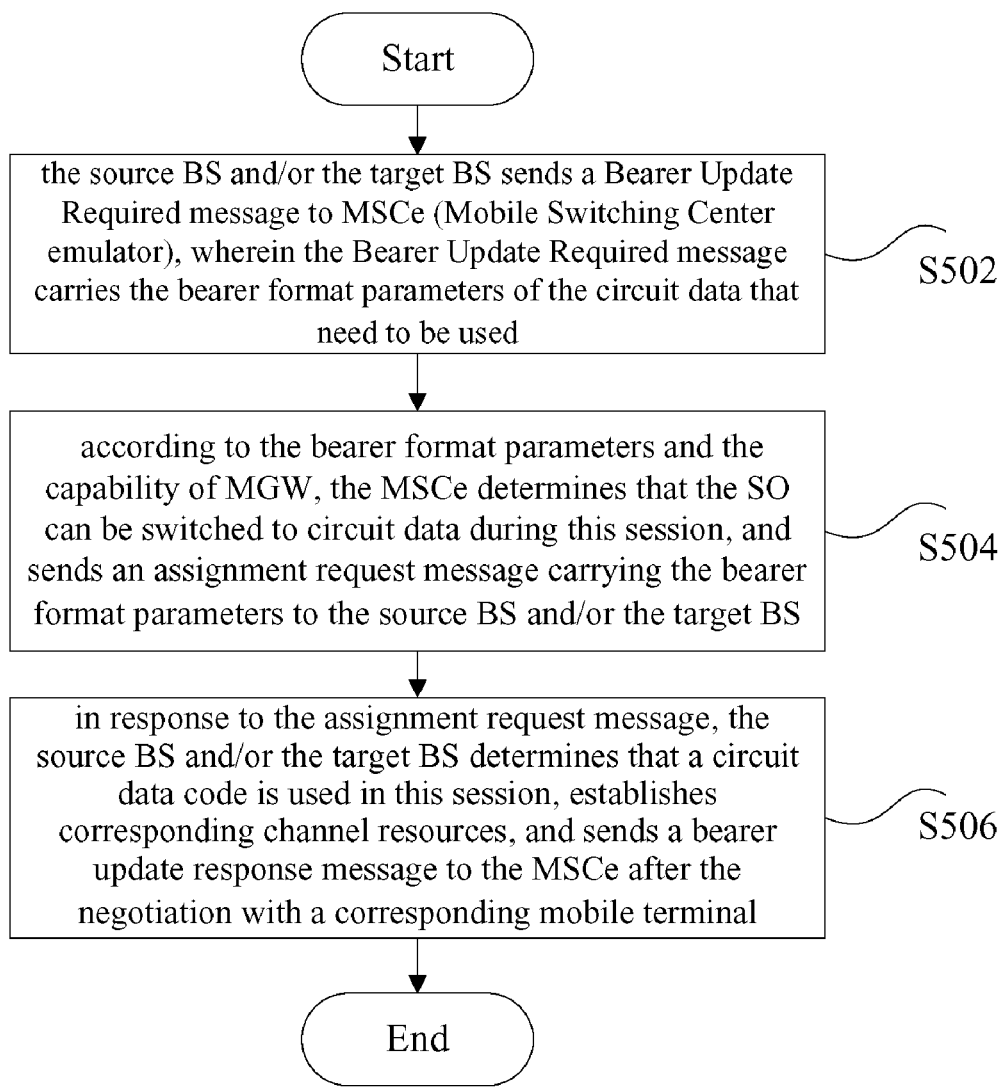
FIG. 5 is a flowchart of determining bearer format parameters by the source BS and/or the target BS.

As shown in FIG. 5, the processing that the source BS and/or the target BS determines the bearer format parameters of the session includes the following steps:

S502, the source BS and/or the target BS sends a Bearer Update Required message to MSCe (Mobile Switching Center emulator), wherein the Bearer Update Required message carries the bearer format parameters of the circuit data that need to be used; S504, according to the bearer format parameters and the capability of MGW, the MSCe determines that the SO can be switched to circuit data during this session, and sends an assignment request message carrying the bearer format parameters to the source BS and/or the target BS; and S506, in response to the assignment request message, the source BS and/or the target BS determines that a circuit data code is used in this session, establishes corresponding channel resources, and the source BS and/or the target BS sends a bearer update response message to the MSCe after the negotiation with a corresponding mobile terminal.

The Bearer Update Required message sent to the MSCe by the source BS and/or the target BS at S502 is described as follows: first, besides sending the bearer format parameters of the circuit data that need to be used carried in the Bearer Update Required message to the MSCe, the SO information used by the present circuit data must be also carried to the MSCe, wherein the SO information is carried through extended domain; in addition, a value is added in the Bearer Update Required message, such as 0x2D (A2p Service Option Change to Circuit data Service), representing that the reason why the BS requests bearer update is the switch of the SO to circuit data service during the voice call; and also, the value range of the bearer format ID field in the message is 8-15, and herein suppose the value is 9 (circuit data), it represents that the requested bearer format is circuit data, RTP PayloadType=60H-7FH (dynamically assigned=IWF).

In addition, as shown in FIG. 6, the above extended domain includes the extended ID, the extended length, and the extended parameter in the A2p bearer format parameters; in addition, as shown in FIG. 7, added in the extended domain is the SO of the circuit data to be adopted by this session.

The following is the description of S406.

At S406, the source BS and/or the target BS makes a secondary negotiation with the mobile station to notify the mobile station to switch the SO to circuit data, or to notify the mobile station that the BS side has completed the negotiation about switching the SO to circuit data. Optionally, at this step, the BSS further compares the current RC configuration with the RC configuration requested by the mobile station, wherein if the two are consistent with each other, the RC will not be changed, while if inconsistent, RC switching will be conducted.

Figure 8:
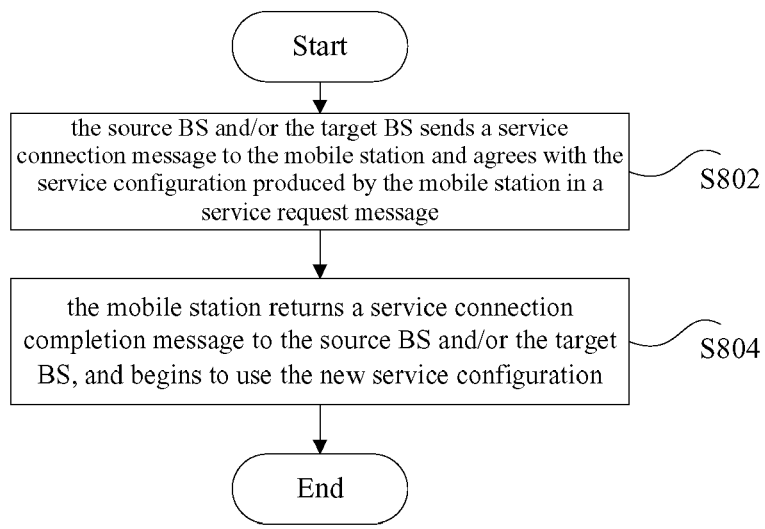
FIG. 8 is a flowchart of an embodiment that the source BS and/or the target BS makes a secondary service negotiation with the mobile station.

Wherein, if the source BS and/or the target BS is the initiating party initiating the switch of voice to fax, then as shown in FIG. 8, the secondary service negotiation at S406 includes the following steps: S802, the source BS and/or the target BS sends a service connection message to the mobile station and agrees with the service configuration produced by the mobile station in a service request message; and S804, the mobile station returns a service connection completion message to the source BS and/or the target BS, and begins to use the new service configuration.

Figure 9:
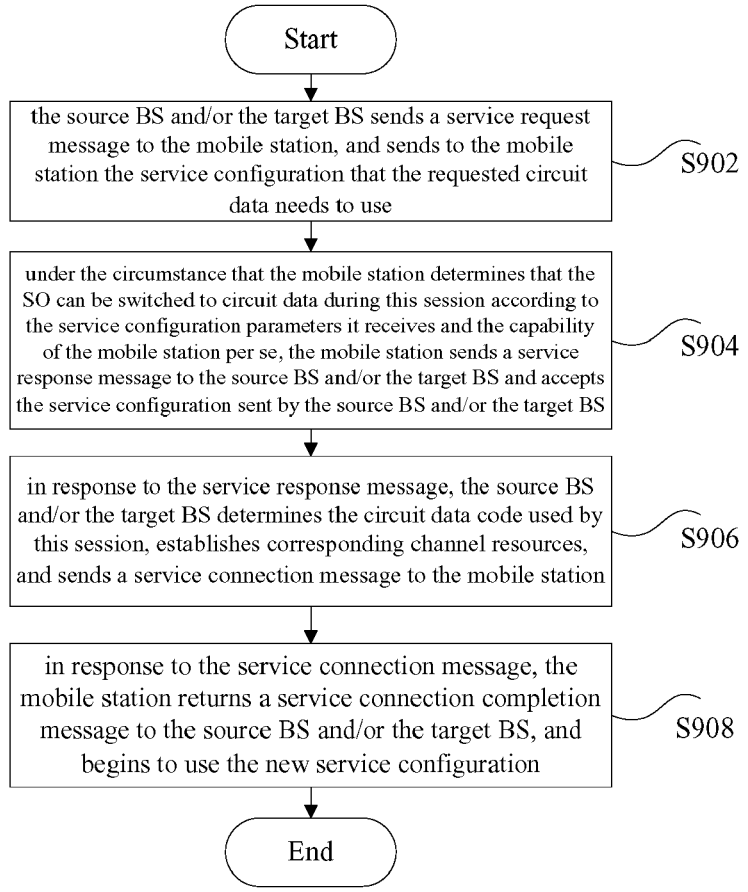
FIG. 9 is a flowchart of another embodiment that the source BS and/or the target BS makes a secondary service negotiation with the mobile station.

On the contrary, if the source BS and/or the target BS is not the initiating party initiating the switch of voice to fax, as shown in FIG. 9, the secondary service negotiation at S406 includes the following steps: S902, the source BS and/or the target BS sends a service request message to the mobile station, and sends to the mobile station the service configuration that the requested circuit data needs to use; S904, under the circumstance that the mobile station determines that the SO can be switched to circuit data during this session according to the received service configuration parameters and the capability of the mobile station per se, the mobile station sends a service response message to the source BS and/or the target BS and accepts the service configuration sent by the source BS and/or the target BS; S906, in response to the service response message, the source BS and/or the target BS determines the circuit data code used by this session, establishes corresponding channel resources, and sends a service connection message to the mobile station; and S908, in response to the service connection message, the mobile station returns a service connection completion message to the source BS and/or the target BS, and begins to use the new service configuration.

The method for switching SO to circuit data according to the above embodiments will be described in detail hereinafter in conjunction with specific embodiments.

The First Embodiment

Figure 10:
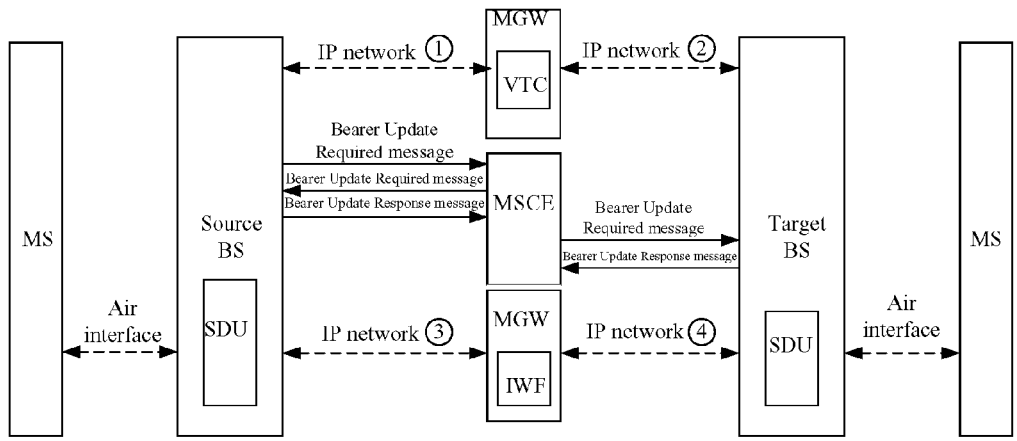
FIG. 10 is a schematic view of the negotiation about the switch to circuit data during a voice call according to the first embodiment of the present invention.

As shown in FIG. 10, the source BS and the target BS complete the negotiation of bearer parameters in conformity with standard IOS5.0 protocol, and the system makes normal voice call after the negotiation. During the call, the source BS receives a service request from the MS for switching the SO to circuit data, determines that the BS side supports the SO required by the MS, and the source BS completes the negotiation of the bearer format by carrying the A2p bearer parameter in the Bearer Update Required message of the BS side, and the target BS completes the negotiation of the bearer format by carrying the A2p bearer parameter in the Bearer Update Required message of the MSS side.

Specifically, the following processes are included:

Step 1, the source BS completes the negotiation of the bearer format with the MSCe, which is detailed as follows: (a1) during the call, the source BS sends to the MSCe the bearer format parameters of the circuit data that needs to be used in the Bearer Update Required message of the BS side, and the RTP load type and the bearer format ID in the carried A2p Bearer Format-Specific Parameters determine the corresponding relationship between a circuit data code frame format and the RTP load type; suppose the source BS determines that the code used in this session is circuit data, use a reserved bearer format ID value with a value range of 8-15, and herein suppose the value is 9, the code name is circuit data, the load type is a dynamic bearer type value, and the frame format is the load format of the circuit data; (b1) the MSCe receives the Bearer Update Required message sent from the source BS, and upon judgment, said message is switching the SO to circuit data, the MSCe determines that the SO can be switched to circuit data in this session according to the bearer format parameters sent from the source BS, the capability of the MGW and the resources, and sends to the source BS a Bearer Update Required message carrying the bearer parameters; (c1) after receiving the Bearer Update Required message sent from the MSCe, the source BS determines that circuit data is used in this session according to the bearer format therein, establishes corresponding channel resources, and the source BS sends to the MSCe a bearer update response message after the negotiation with a corresponding MS; and (d1) the source BS determines whether to change RC according to the current RC configuration and the RC configuration requested by the MS, and conducts RC switching if so.

Step 2, the MSCe completes the negotiation of the bearer format with the target BS, which is detailed as follows: (a2) during the call, the MSCe receives the Bearer Update Required message sent from the source BS, and upon judgment, said message is switching the SO to circuit data, the MSCe determines that the SO can be switched to circuit data in this session according to the bearer format parameters sent from the source BS, the capability of the MGW and the resources, and sends to the source BS a Bearer Update Required message carrying the bearer parameters, and after receiving the bearer update response message sent from the source BS, the MSCe sends a Bearer Update Required message carrying the bearer parameters to the target BS; (b2) after receiving the Bearer Update Required message sent from the MSCe, the target BS determines that the bearer format needs to be changed to circuit data in this session according to the bearer format therein, establishes corresponding channel resources, and sends to the MSCe a bearer update response message after the negotiation with a corresponding MS; (c2) after receiving the Bearer Update Required message sent from the MSCe, the target BS determines that the bearer format needs to be changed to circuit data in this session according to the bearer format therein, and sends a service request message to the MS to notify the MS to switch the SO to circuit data; upon determining that the MS supports the circuit data, the MS returns a service response message to the target BS after completing relevant configurations, and accepts the service configuration proposed by the BS; and upon receiving the service response message, the target BS determines that a circuit data code is used in this session, establishes corresponding channel resources, and returns a service connection message to the MS, and the MS returns a service connection completion message to the target BS, begins to use the new service configuration, and at the same time sends to the facsimile machine connected therewith a fax voice to notify the user that the opposite end user of the call has switched the SO to the circuit data; and (d2) after receiving the Bearer Update Required message sent from the MSCe, the target BS determines whether to change RC according to the current RC configuration and the RC configuration corresponding to the SO in the Bearer Update Required message, and conducts RC switching if so.

Step 3, the MSCe allocates a corresponding IWF resource according to the bear formats negotiated respectively by the MSCe with the source BS and the target BS, and completes relevant internal work at the MSS side for switching the SO to circuit data, including allocation of new resources, release of old resources, connection of circuit data link, etc.

Step 4, after switching the SO to circuit data, the source BS and the target BS conducts user traffic layer encapsulation on the circuit data received via air interface according to a certain load format, respectively, and then encapsulates them as RTP packets which are then sent to the MGW over IP network.

Step 5, after switching the SO to circuit data, the MGW receives the RTP packets from the source BS and the target BS, analyzes User Traffic user data from the received RTP packets and processes the same according to the load format, acquires the payload of the circuit data on which is performed the circuit data processing by an IWF module, and then the processed circuit data is performed with User Traffic layer encapsulation according to the certain load format, and then the encapsulated RTP packets are sent to the opposite end BS over IP network.

Step 6, the source BS and the target BS analyzes User Traffic user data from the received RTP packets and processes the same according to the load format, acquires the corresponding payload of the circuit data which is then sent to the corresponding MS via air interface.

The Second Embodiment

Figure 11:
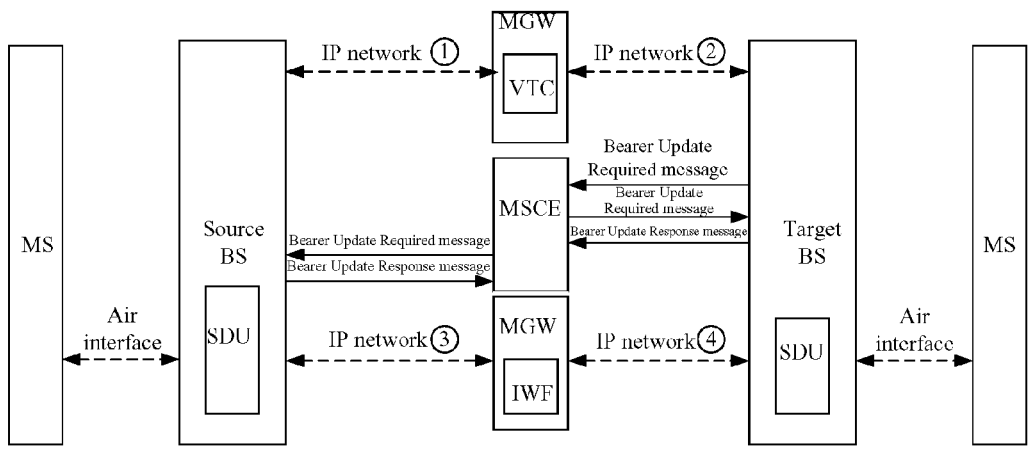
FIG. 11 is a schematic view of the negotiation about the switch to circuit data during a voice call according to the second embodiment of the present invention.

As shown in FIG. 11, the source BS and the target BS complete the negotiation of bearer parameters in conformity with standard IOS5.0 protocol, and the system makes normal voice call after the negotiation. During the call, the target BS receives a service connection request from the MS for switching the SO to circuit data, determines that the BS side supports the SO required by the MS, and the target BS completes the negotiation of the bearer format by carrying the A2p bearer parameter in the Bearer Update Required message of the BS side, and the source BS completes the negotiation of the bearer format by carrying the A2p bearer parameter in the Bearer Update Required message of the MSS side.

Specifically, the following processes are included:

Step 1, the target BS completes the negotiation of the bearer format with the MSCe, which is detailed as follows: (a1) during the call, the target BS sends to the MSCe the bearer format parameters of the circuit data that needs to be used in the Bearer Update Required message of the BS side, and the RTP load type and the bearer format ID in the carried A2p Bearer Format-Specific Parameters determine the corresponding relationship between a circuit data code frame format and the RTP load type; suppose the source BS determines that the code used in this session is circuit data, use a reserved bearer format ID value with a value range of 8-15, and herein suppose the value is 9, the code name is circuit data, the load type is a dynamic bearer type value, and the frame format is the load format of the circuit data; (b1) the MSCe receives the Bearer Update Required message sent from the target BS, and upon judgment, said message is switching the SO to circuit data, the MSCe determines that the SO can be switched to circuit data in this session according to the bearer format parameters sent from the target BS, the capability of the MGW and the resources, and sends to the target BS a Bearer Update Required message carrying the bearer parameters; (c1) after receiving the Bearer Update Required message sent from the MSCe, the target BS determines that circuit data is used in this session according to the bearer format therein, establishes corresponding channel resources, and the target BS sends to the MSCe a bearer update response message after the negotiation with a corresponding MS; and (d1) the target BS determines whether to change RC according to the current RC configuration and the RC configuration requested by the MS, and conducts RC switching if so.

Step 2, the MSCe completes the negotiation of the bearer format with the source BS, which is detailed as follows: (a2) during the call, the MSCe receives the Bearer Update Required message sent from the target BS, and upon judgment, said message is switching the SO to circuit data, the MSCe determines that the SO can be switched to circuit data in this session according to the bearer format parameters sent from the source BS, the capability of the MGW and the resources, and sends to the target BS a Bearer Update Required message carrying the bearer parameters, and after receiving the bearer update response message sent from the target BS, the MSCe sends a Bearer Update Required message carrying the bearer parameters to the source BS; (b2) after receiving the Bearer Update Required message sent from the MSCe, the source BS determines that the bearer format needs to be changed to circuit data in this session according to the bearer format therein, establishes corresponding channel resources, and sends to the MSCe a bearer update response message after the negotiation with a corresponding MS; (c2) after receiving the Bearer Update Required message sent from the MSCe, the source BS determines that the bearer format needs to be changed to circuit data in this session according to the bearer format therein, and sends a service request message to the MS to notify the MS to switch the SO to circuit data; upon determining that the MS supports the circuit data, the MS returns a service response message to the target BS after completing relevant configurations, and accepts the service configuration proposed by the BS; and upon receiving the service response message, the source BS determines that a circuit data code is used in this session, establishes corresponding channel resources, and returns a service connection message to the MS, and the MS returns a service connection completion message to the source BS, begins to use the new service configuration, and at the same time sends to the facsimile machine connected therewith a fax voice to notify the user that the opposite end user of the call has switched the SO to the circuit data; and (d2) after receiving the Bearer Update Required message sent from the MSCe, the source BS determines whether to change RC according to the current RC configuration and the RC configuration corresponding to the SO in the Bearer Update Required message, and conducts RC switching if so.

The subsequent processes are the same with steps 3-6 in the first embodiment and thus are omitted here.

The Third Embodiment

Figure 12:
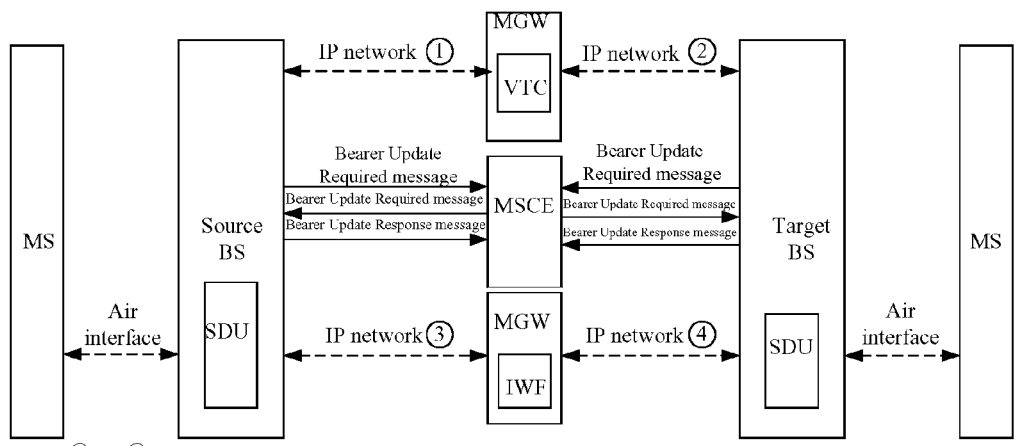
FIG. 12 is a schematic view of the negotiation about the switch to circuit data during a voice call according to the third embodiment of the present invention.

As shown in FIG. 12, the source BS and the target BS complete the negotiation of bearer parameters in conformity with standard IOS5.0 protocol, and the system makes normal voice call after the negotiation. During the call, both of the source BS and the target BS receive a service connection request from the MS for switching the SO to circuit data, determine that the BS side supports the SO required by the MS, and both of the source BS and the target BS complete the negotiation of the bearer format by carrying the A2p bearer parameter in the Bearer Update Required message of the BS side, and the source BS and the target BS complete the negotiation of the bearer format by carrying the A2p bearer parameter in the Bearer Update Required message of the MSS side.

Specifically, the following processes are included:

Step 1, the source BS completes the negotiation of the bearer format with the MSCe, which is detailed as follows: (a1) during the call, the source BS sends to the MSCe the bearer format parameters of the circuit data that needs to be used in the Bearer Update Required message of the BS side, and the RTP load type and the bearer format ID in the carried A2p Bearer Format-Specific Parameters determine the corresponding relationship between a circuit data code frame format and the RTP load type; (b1) the MSCe receives the Bearer Update Required message sent from the source BS, and upon judgment, said message is switching the SO to circuit data, the MSCe determines that the SO can be switched to circuit data in this session according to the bearer format parameters sent from the source BS, the capability of the MGW and the resources, and sends to the source BS a Bearer Update Required message carrying the bearer parameters; (c1) after receiving the Bearer Update Required message sent from the MSCe, the source BS determines that circuit data is used in this session according to the bearer format therein, establishes corresponding channel resources, and the source BS sends to the MSCe a bearer update response message after the negotiation with a corresponding MS; and (d1) the source BS determines whether to change RC according to the current RC configuration and the RC configuration requested by the MS, and conducts RC switching if so.

Step 2, the target BS completes the negotiation of the bearer format with the MSCe, which is detailed as follows: (a2) during the call, the target BS sends to the MSCe the bearer format parameters of the circuit data that needs to be used in the Bearer Update Required message of the BS side, and the RTP load type and the bearer format ID in the carried A2p Bearer Format-Specific Parameters determine the corresponding relationship between a circuit data code frame format and the RTP load type; (b2) the MSCe receives the Bearer Update Required message sent from the target BS, and upon judgment, said message is switching the SO to circuit data, the MSCe determines that the SO can be switched to circuit data in this session according to the bearer format parameters sent from the source BS, the capability of the MGW and the resources, and sends to the target BS a Bearer Update Required message carrying the bearer parameters; (c2) after receiving the Bearer Update Required message sent from the MSCe, the target BS determines that circuit data is used in this session according to the bearer format therein, establishes corresponding channel resources, and sends to the MSCe a bearer update response message after the negotiation with a corresponding MS; and (d2) the target BS determines whether to change RC according to the current RC configuration and the RC configuration requested by the MS, and conducts RC switching if so.

The subsequent processes are the same with steps 3-6 in the first embodiment and thus are omitted here.

It should be noted that the values of the extended ID and the extended parameters mentioned in the above embodiments are only illustrative, and other values of the extended ID and the extended parameters can be used in this invention.

Of course, the present invention can be realized in many other modes, for example, when the calling user initiates a call for the circuit data and the called user receives the circuit data switched from the SO through voice, the source BS sends to the MSCe the circuit data bearer format parameters supported by the BS through the connection management service request message or the assignment completion message thereafter, and the target BS sends to the MSCe the bearer format parameters of the circuit data that needs to be used in the Bearer Update Required message of the BS side; likewise, when the calling user adopt voice to switch the SO to circuit data and the called user receives the circuit data, the source BS sends to the MSCe the bearer format parameters of the circuit data that needs to be used in the Bearer Update Required message of the BS side, and the target BS sends to the MSCe the supported circuit data bearer format parameters through a paging response message or an assignment completion message thereafter.

New embodiments can be obtained through free combinations of modes of the negotiation of the bearer format conducted by the source BS and the target BS.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

What is claimed is:

1. A method, comprising:
    by a mobile station and during a session, notifying at least one Base Station (BS) to switch a Service Option to circuit data, the at least one BS being of a pair of base stations comprising a source BS and a target BS, each of the source BS and the target BS being an opposite end BS with respect to each other;

by the at least one BS, making a negotiation with a mobile switching subsystem about the switching to the circuit data and accordingly determining bearer format parameters of the session;

by the at least one BS and after the negotiation with the mobile switching subsystem succeeds, making a secondary service negotiation with the mobile station; and after the negotiation with the mobile station succeeds and in the circuit data, and by the at least one BS, conducting user interface traffic layer encapsulation according to a certain load format, and then transmitting encapsulated Real-Time Transport Protocol packets to the opposite end BS.

2. The method of claim 1, wherein while establishing the session, the at least one BS determines that a code used in the session is voice, and a value of a bearer format ID in the determined bearer format parameters is a voice call bearer format ID.

3. The method of claim 1, wherein the notifying comprises if the circuit data is a G3 fax, the mobile station determines whether to switch the Service Option to the G3 fax according to a Calling Tone (CNG) / Called Terminal Identification (CED) voice from a facsimile machine.

4. The method of claim 1, wherein the notifying comprises if the circuit data is asynchronous data, the mobile station determines whether to switch the Service Option to asynchronous data according to a calling number of an opposite end.

5. The method of claim 1, wherein the determining the bearer format parameters of the session comprises:

sending a Bearer Update Required message to a Mobile Switching Center emulator (MSCe) via the at least one BS, wherein the Bearer Update Required message carries the bearer format parameters;

according to the bearer format parameters and capability of a Media GateWay (MGW), determining that the Service Option can be switched to the circuit data during the session, and sending an assignment request message carrying the bearer format parameters to the at least one BS via the MSCe; and in response to the assignment request message, determining a circuit data code used in the session, establishing corresponding channel resources, and sending a bearer update response message to the MSCe via the at least one BS after a negotiation with a corresponding mobile terminal.

6. The method of claim 5, wherein the Bearer Update Required message further carries Service Option information used by the circuit data.

7. The method of claim 6, wherein the Service Option information is carried through an extended domain that comprises extended ID, extended length, and extended parameters in the bearer format parameters.

8. The method of claim 1, wherein the at least one BS makes the negotiation with the mobile station to notify the mobile station to switch the Service Option to the circuit data, or to notify the mobile station that a BS side has completed the negotiation, about switching the Service Option to the circuit data, with the mobile switching subsystem.

9. The method of claim 1, wherein the making the negotiation with the mobile station comprises a Base Station Subsystem comparing a current Radio Configuration (RC) configuration with an RC configuration requested by the mobile station, and conducting switching if they are inconsistent with each other.

10. The method of claim 1, wherein for an initiator that initiates a switch of voice to fax, the negotiation with the mobile station comprises:

sending a service connection message to the mobile station of agreeing with a service configuration raised by the mobile station in a service request message, via the at least one BS; and returning a service connection message to the at least one BS, and beginning to use a new service configuration via the mobile station.

11. The method of claim 1, wherein for an initiator that initiates a switch of voice to fax, the negotiation with the mobile station comprises:

via the at least one BS, sending a service request message to the mobile station to provide service configuration parameters to be used by the circuit data ;

if the mobile station determines that the Service Option can be switched to the circuit data during the session according to the service configuration parameters and capability of the mobile station, sending a service response message to the at least one BS and accepting a new service configuration sent from the at least one BS via the mobile station;

in response to the service response message, determining a circuit data code used by the session, establishing corresponding channel resources, and sending a service connection message to the mobile station via the at least one BS; and in response to the service connection message, returning a service connection completion message to the at least one BS, and beginning to use the new service configuration via the mobile station.

12. The method of claim 1, further comprising:

after receiving the Real-Time Transport Protocol packets, analyzing user interface traffic layer user data and processing the same according to the certain load format, and obtaining payload of the circuit data via the at least one BS.

13. A Base Station (BS) comprising:

means for being notified from a mobile station during a session to switch a Service Option to circuit data;

means for making a negotiation with a mobile switching subsystem about the switching to the circuit data, and means for accordingly determining bearer format parameters of the session;

means for making a secondary service negotiation with the mobile station after the negotiation with the mobile switching subsystem succeeds;

means for, by at least the BS and after the negotiation with the mobile station succeeds, conducting user interface traffic layer encapsulation in the circuit data according to a certain load format and then transmitting encapsulated Real-Time Transport Protocol packets to an opposite end BS; and wherein the BS and another BS are a pair of base stations comprising a source BS and a target BS, each of the source BS and the target BS being the opposite end BS with respect to each other.

14. The BS of claim 13, further comprising means for determining, while establishing the session, that a code used in the session is voice, and a value of a bearer format ID in the determined bearer format parameters is a voice call bearer format ID.

15. The BS of claim 13, wherein the means for determining the bearer format parameters of the session comprises means for sending a Bearer Update Required message to a Mobile Switching Center emulator (MSCe), wherein the Bearer Update Required message carries the bearer format parameters.

16. The BS of claim 13, further comprising means for analyzing, after receiving the Real-Time Transport Protocol packets, user interface traffic layer user data, means for processing the same according to the certain load format, and means for obtaining payload of the circuit data.

17. A system comprising:
a source Base Station (BS);
a target BS;
a mobile station;
a mobile switching subsystem;
wherein the source BS and the target BS are a pair of base stations each being an opposite end BS with respect to each other; and
wherein at least one BS of the source BS and the target BS is enabled to:
  be notified from the mobile station during a session to switch a Service Option to circuit data;
  make a negotiation with the mobile switching subsystem about the switching to the circuit data, and to accordingly determine bearer format parameters of the session;
  make a secondary service negotiation with the mobile station after the negotiation with the mobile switching subsystem succeeds; and
  after the negotiation with the mobile station succeeds and in the circuit data, conduct user interface traffic layer encapsulation according to a certain load format, and then transmit encapsulated Real-Time Transport Protocol packets to the opposite end BS.

18. The system of claim 17, wherein the at least one BS is further enabled to determine, while establishing the session, that a code used in the session is voice, and a value of a bearer format ID in the determined bearer format parameters is a voice call bearer format ID.

19. The system of claim 17, wherein the mobile station is enabled to determine whether to switch the Service Option to G3 fax according to a Calling Tone (CNG)/ Called Terminal Identification (CED) voice from a facsimile machine.

20. The system of claim 17, wherein the mobile station is enabled to determine whether to switch the Service Option to asynchronous data according to a calling number.

\* \* \* \* \*